July 19, 1960 — A. L. BOEGEHOLD — 2,945,272
PROCESS AND APPARATUS FOR FORMING REINFORCED THIN-WALLED SHELL MOLDS
Filed April 20, 1956 — 3 Sheets-Sheet 1
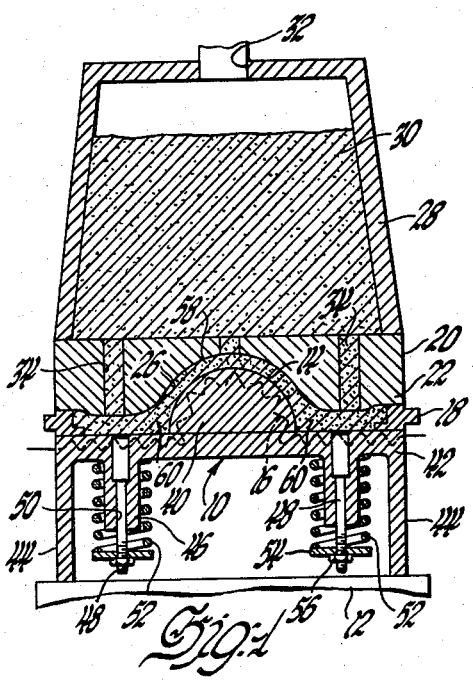
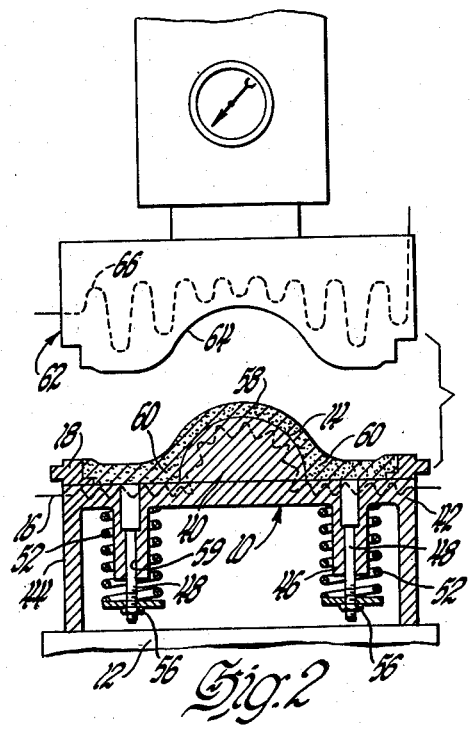
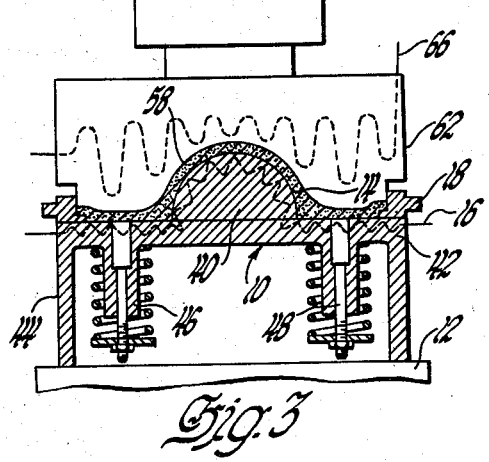
INVENTOR.
Alfred L. Boegehold
BY
ATTORNEY

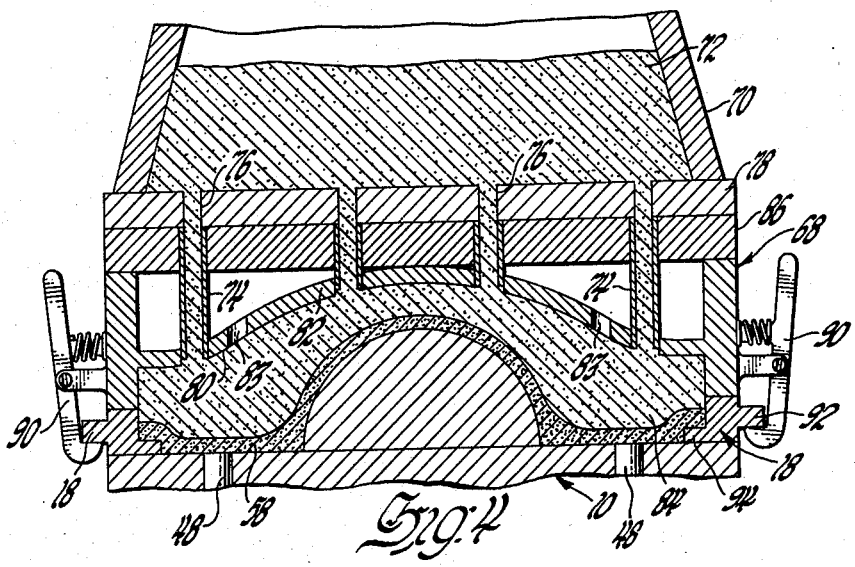

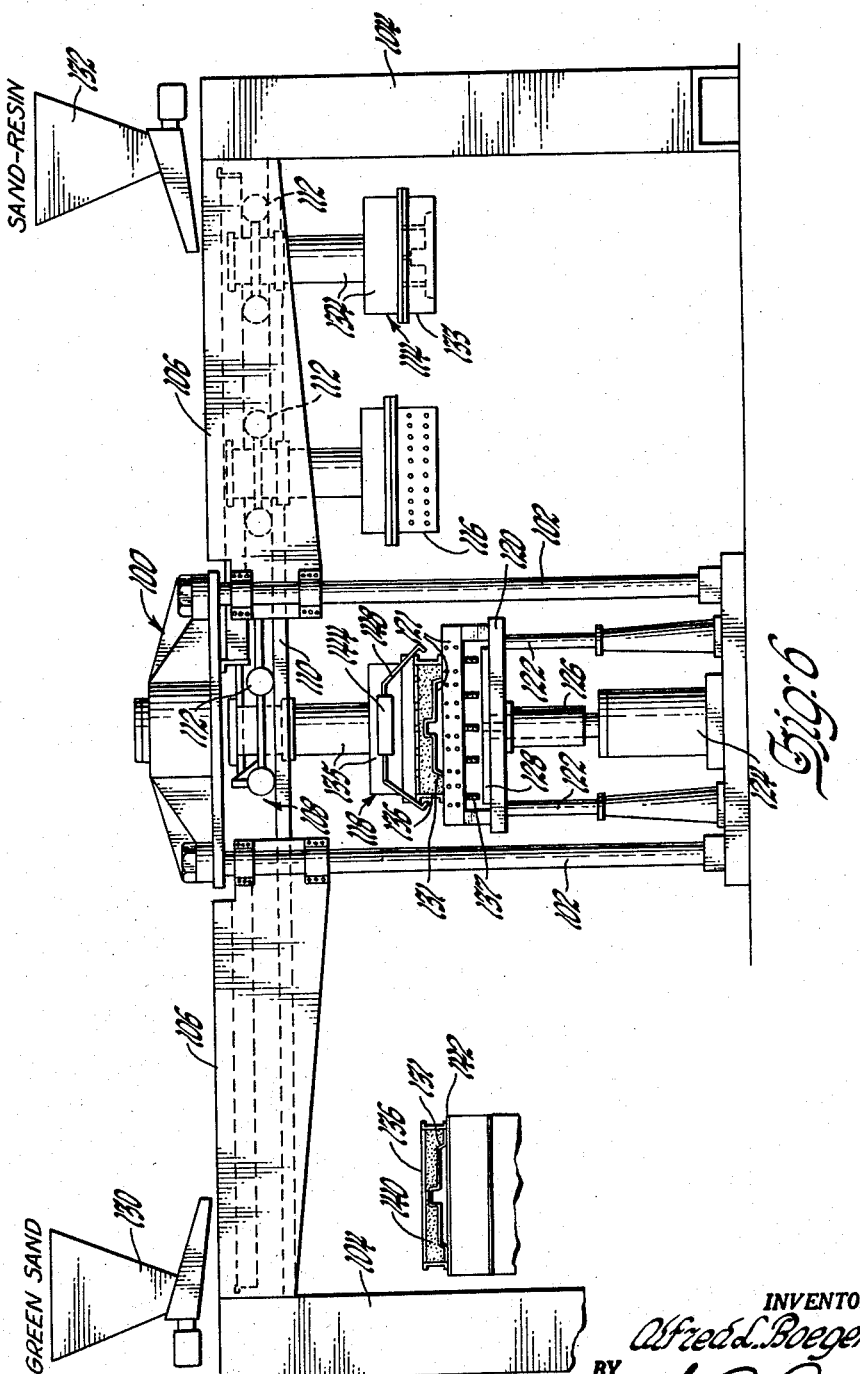

United States Patent Office 2,945,272
Patented July 19, 1960

2,945,272

PROCESS AND APPARATUS FOR FORMING REINFORCED THIN-WALLED SHELL MOLDS

Alfred L. Boegehold, Detroit, Mich., assignor to General Motors Corporation, Detroit, Mich., a corporation of Delaware Filed Apr. 20, 1956, Ser. No. 579,583

7 Claims. (Cl. 22—36)

This invention relates to shell molding operations and particularly to a process and apparatus for forming and using shell molds having very thin walls.

As is now well known, the shell molding process involves the formation and use of thin-walled dispensable molds and cores composed of sand and resinous binders. This process can be used to produce precision castings in a wide variety of metals.

Essentially the shell molding process consists of using a heat-hardenable plastic or resin as a binder for the grains of sand or other suitable refractory material to form rigid molds having high gas permeability, good surface smoothness and dimensional stability. The molding material, which is generally a mixture of a major proportion of silica or other refractory oxide sand and a minor proportion of thermosetting resin binder, is normally used in dry form with no water being added. For some applications it is preferable to coat the sand particles with the resin before application to the pattern, while in other instances the resin is merely mixed with the sand in powdered form. Phenol-formaldehyde, phenol-furfural, melamine-formaldehyde and urea-formaldehyde are typical examples of the type of thermosetting binders preferably used.

These shell or sand-resin molds are prepared by allowing the sand and resin to come into contact with a hot pattern for a short period of time. A generally uniform layer of the mix adheres to the pattern surfaces due to the melting of the resin which bonds the sand with which it is intimately mixed, thereby accurately reproducing pattern details. The half patterns, gates and runners usually are permanently fixed on metal plates. Metal patterns normally must be used because they are subjected to elevated temperatures. Pattern temperatures between 350° F. annd 500° F. are typical, but temperatures as low as 250° F. or lower and as high as 700° F. or even higher may be advantageously employed under certain conditions.

The pattern temperature, the characteristics of the resin and sand used, and the length of time the molding material is allowed to remain in contact with the hot pattern determine the thickness of the mold. Mold build-up times generally range from a few seconds to approximately one minute, depending on the particular application. After this short time interval any excess or unbonded sand and resin are removed, and the closely adhering sand-resin layer is preferably cured while in contact with the pattern by subjecting it to a temperature within the range of approximately 300° F. to 1500° F. The curing or baking time is relatively short, usually from a few seconds to five minutes. This curing operation results in the conversion of the resinous material to a hard, insoluble binder which securely bonds the sand grains together.

After curing of the mold, it is stripped from the pattern and is ready for use. The formed molds are, in effect, thin shells which have sufficient strength and stiffness to make them suitable for many casting operations.

As normally practiced in commercial applications of the shell molding procedures prior to my invention, the sand-resin mix contains approximately 4% to 8% of the thermosetting binder. Likewise, the resultant shell molds usually have an average thickness of 3/16 inch to 5/8 inch, a thickness of about 1/4 inch being typical. Generally it has been necessary to use molds of this thickness and resin content in order to provide them with the required strength, especially in molds for larger castings and where accurate details and smooth casting surfaces are desired. Since the cost of the resin is a limiting factor in the use of the shell molding process, it is highly advantageous to provide a procedure in which thinner shells and smaller amounts of resin may be used.

An improved method of forming shells molds in which the amount of heat-hardenable or thermosetting resinous binder is reduced without decreasing the strength of the mold is disclosed in my co-pending patent application S.N. 358,015, owned by the assignee of the present invention. While the method described in that application has proved to be generally satisfactory, the type of shell mold produced normally requires an accurately fitting back-up. Since in some applications the expansion of the mold, upon pouring of the molten casting metal, is restricted to too great an extent by the back-up, crushing of the mold results.

A principal object of the present invention, therefore, is to provide a method of forming a shell mold assembly having an accurately shaped thin-walled molding layer which will not break during metal casting operations and a green sand backing layer. A further object of the invention is to provide a method of forming a reinforced shell mold having a casting-defining shell layer containing a relatively small amount of heat hardenable or thermosetting resin binder.

In accordance with my invention, a mixture of sand or other suitable comminuted refractory material and resin is first applied to a heated pattern, and the layer or shell of this mixture which adheres to the pattern is compacted. Although these steps may be employed successively, it is preferred to apply heat and pressure simultaneously to the back of the shell adhering to the heated pattern. This procedure not only compacts the sand and resin so as to reduce the thickness of the shell but it also results in a rapid cure. Consequently, a thin-walled strong shell mold is produced, permitting the use of a relatively small amount of the binder. Satisfactory shell molds can be made in this manner with as little as 1% resin when relatively coarse sand is used, while excellent results are obtained when approximately 2% to 5% resin is employed in conjunction with somewhat finer sands.

After the mold shell has been formed in the foregoing manner, a suitable box or flask, preferably in the form of a blowhead, is placed over the back of the mold which still adheres to the pattern. This flask may be attached to the pattern by clamps or other appropriate means. The flask is so designed that its edges contact the edges of the pattern or mold, while a wall of the flask is spaced from the back of the mold shell a short distance. Normally the clearance between the shell mold and the inside surface of the flask wall need not exceed approximately two inches, and an average clearance of not more than one-half inch frequently is satisfactory. It also is desirable to contour this wall of the flask so that it parallels the contour of the shell, thus reducing weight and simplifying handling of the assembly.

Thereafter green sand or other suitable comminuted back-up material is blown into the space between the back of the shell and the adjacent wall of the flask so as to completely occupy this space. The green sand functions as a reinforcing layer for the thin-walled shell.

This back-up provides the necessary support for the shell and at the same time yields to a sufficient extent to permit expansion of the mold during metal pouring operations to prevent crushing of the shell. After the green sand blowing operation the mold is stripped from the pattern, and two complementary mold shells, which are reinforced in the above-described manner, are placed in abutment to receive molten casting metal. The flasks and back-up sand support the thin-walled shell during the pouring operation. Of course, the flasks are removed from the shell and reused after the casting has solidified.

The amount of pressure employed in compacting the sand-resin mold shell or layer is dependent on a number of factors, including the temperature of the pattern, the amount of resin used, and the degree of permeability desired in the final mold. It is presently preferred to apply pressures of about 750 to 1000 pounds per square inch to the back of the shell mold adhering to the heated pattern. However, pressures as low as 25 to 50 pounds per square inch have been successfully used, as well as pressures as high as 2000 pounds per square inch and above. In general, it is considered advantageous to apply sufficient pressure to the shell to reduce the thickness of the shell approximately 15% to 25%. Of course, the time of application of the pressure and heat should be no longer than necessary to complete the cure of the resin. Normally the curing time need not exceed about 15 to 20 seconds, but in some cases a cure of 30 seconds or even one minute may be required.

The preferred method of applying the pressure is by means of an accurately contoured die. If desired, the dimensions of this pressure head or squeeze die may be such as to apply the greatest pressure to parts of the mold shell which are spaced from the casting cavity portion of the mold, thus producing greater strength and less permeability in these areas. Die temperatures of about 350° F. to 900° F. have been found to be satisfactory, but under some conditions temperatures as low as 300° F. may be used.

While it is a greatly preferred practice to heat the pressure applying means so that heat and pressure are applied simultaneously to the shell adhering to the pattern, it is within the scope of the invention in its broader aspects to use a press head which is not heated except from the heat of the shell mold and pattern. In such instances, after pressing the shell adhering to the heated pattern, the pattern and adhering shell are cured in an oven or furnace heated to a temperature within the aforementioned ranges.

The refractory material and resin may be the same as those used in conventional shell molding operations. Any heat-hardenable or thermosetting resin, such as those hereinbefore described, may be employed as the binder. Typical set-accelerators or hardeners for the resin, such as hexamethylenetetramine and paraformaldehyde, also can be included in the molding mix if desired. The refractory material generally consists largely of silica or other refractory oxide sand. It is desirable to use sand which is free of clay, moisture and organic matter since these materials tend to decrease the strength of the mold. Silica flour or other finely comminuted refractory materials may be included in the molding mix to provide the mold with an exceptionally smooth working surface. Normally the sand and pulverized resin are simply intimately mixed and the mixture applied to the heated pattern. However, it is also contemplated that the present invention may be practiced with sand which has been pre-coated with resin before being applied to the heated pattern. As in conventional shell molding, any suitable mold release agent may be added in the molding mix or applied directly to the pattern.

It is not always necessary to employ an accurately contoured blowhead for applying the sand-resin mix to the hot pattern. The pressure head or squeeze die accommodates variations in the thickness of the mold and in the smoothness of its back surface, while the use of a green sand back-up layer further reduces the importance of the smoothness of this surface. Hence the invention in its broader aspects is intended to include a procedure in which the sand-resin mix is dumped rather than blown on the hot pattern. Of course, any excess molding mix should be removed before compacting the formed shell.

Other objects and advantages of the present invention will more fully appear from the following detailed description of a preferred embodiment of the invention, reference being made to the accompanying drawings, in which:

Figure 1 is a schematic sectional view showing an apparatus for blowing a mixture of sand and resin into a cavity formed between a blowhead and a heated pattern;

Figure 2 is a schematic elevational view, with parts broken away and in section, showing a pattern and adhering layer of sand and resin with a pressure member located above the pattern;

Figure 3 is a view similar to Figure 2 but with the layer of sand and resin compacted by the pressure member;

Figure 4 is a somewhat schematic sectional view showing the pattern and adhering cured shell mold clamped in position against a flask or blowhead and with green sand blown between the flask and the back of the shell mold;

Figure 5 is a view similar to Figure 4 showing two shell mold halves in abutting position to receive molten casting metal, each shell mold half being supported by green sand between it and a flask;

Figure 6 is a schematic elevational view showing a machine for automatically or semi-automatically performing the steps of the process illustrated in Figures 1 through 4.

Referring more particularly to the drawings, in Figure 1 is shown a pattern 10 seated on a pattern rest table or lift table 12 of a sand blowing machine. The pattern has a molding surface 14 adapted to form the desired mold contour, the particular shape shown being one-half of a cylinder. Any suitable heating means may be used for heating the pattern, the pattern shown being provided with an internal heating element 16 of the electrical resistance type. The operating temperature of the pattern preferably should be between 450° F. and 600° F. A rectangular stripper frame or spacer 18 is heated on the pattern near the edges thereof and is employed in a manner which will be hereinafter explained.

A sand-resin blowhead 20, which actually functions as a female pattern for the mold, is positioned above the pattern and is provided with peripheral portions 22 resting on the frame 18. The central portion is shaped to conform generally to the shape of the pattern but is spaced therefrom, thus forming with the pattern a generally closed cavity 26 for receiving the molding mix. The size of this cavity is preferably designed so as to regulate the as-blown thickness of the sand-resin mold desired. An upwardly tapered magazine 28 containing a sand-resin molding mixture 30 of the type hereinbefore described is shown as located above and affixed to the blowhead. The magazine has its upper end provided with an opening 32 through which the sand-resin mixture and compressed air may be introduced into the magazine. Of course, a suitable quantity of the molding mix is contained in the magazine prior to the actual blowing operation.

The rest table and pattern may be moved vertically into and out of operating position beneath the blowhead by means of a hydraulic cylinder or an air cylinder (not shown).

A plurality of ducts or blow tubes 34 extend through the blowhead and serve to conduct the sand-resin molding mix from the magazine to the mold-forming cavity 26 between the pattern and the blowhead. The unheated blowhead is preferably water cooled, thereby precluding the possibility of the sand-resin molding material fusing within the blowhead and obstructing the passage of fresh molding mix through the ducts 34. Suitable air escape ports may be provided in the blowhead to permit the air which is displaced by the sand-resin mix during the blowing operation to pass from the cavity 26 to the atmosphere.

In the embodiment of the invention shown in the drawings, the pattern 10 is formed of two sections, a base portion 42 and a portion 40 which forms the casting cavity wall of the mold. The base portion of the pattern is provided with depending flanges 44 which are seated on the rest table 12. Also projecting downwardly from the base of the pattern are bosses 46. Vertically movable mold stripper pins 48 extend through openings 50 in the bosses and the portion of the pattern base above these bosses. Helical compression springs 52 are positioned around the bosses and bias the stripper pins in their lower or retracted positions. The lower ends of the springs abut washers 54 which are held in place at the bottom ends of the stripper pins by means of nuts 56.

As shown in the drawings, the mold cavity 26 preferably is shaped to provide the sand-resin layer or shell 58 with thickened portions 60 for added strength. The heat of the pattern fuses the resin in the molding mixture in the mold cavity and binds the sand grains together to form a partially cured relatively porous shell which adheres to the pattern.

The hot pattern and adhering sand-resin shell are then removed and placed under a pressure means 62 having an accurately contoured surface 64 conforming generally to the shape of the back shell. As can be seen from Figures 2 and 3, the dimensions of the pressure die or press head 62 may be such as to squeeze or press portions of the shell more than others. For example, it may be desirable in some cases to apply the most pressure to areas of the shell which are spaced from the casting-defining wall portions to provide the former with greater strength. The pressure head may be heated by any suitable means, such as an electric resistance heater 66. This press head is lowered to contact and then compress or squeeze the sand-resin layer adhering to the heated pattern plate and reduce its thickness. Since both the pattern and press head are heated, the compressed layer or shell of sand and resin is rapidly cured.

Referring now to Figure 4, after the pattern 10 and adhering cured mold shell 58 have been removed from beneath the press head 62, they are positioned beneath a blowhead or flask 68. This flask is located at the discharge end of a magazine 70 containing green sand 72. Appropriate blow tubes 74 are provided in the flask and communicate with openings 76 in the bottom wall 78 of the magazine. Thus green sand is blown from the magazine through the blow tubes and into the cavity 80 formed between the shell mold and the adjacent contoured wall 82 of the green sand flask. Appropriate vent holes 83 should be provided in wall 82 to permit the escape of air displaced from the cavity 80 during the blowing operation. The thickness of the back-up layer 84 of green sand need not exceed two inches. The upper wall 86 of the flask is either detachable from the bottom wall of the magazine or merely held against it to permit removal of the assembled blowhead and pattern.

When the cavity between the cured shell mold and the blowhead 68 has been completely filled with green sand, the pattern is removed from the mold shell with the aid of the stripper pins 50 hereinbefore described. In the modification shown, spring-biased clamps 90 connected to the green sand blowhead hold the stripper frame 18 against the blowhead. This frame is provided with an outwardly extending flange 92 which is engaged by the end of the clamps and with an inwardly extending flange 94 which is located beneath the edge of the cured mold shell. In this manner the mold is held firmly in position against the green sand in the flask.

As shown in Figure 5, two shell molds, together with the attached flasks and supporting green sand are then assembled in abutting relationship to receive the molten casting metal. Any suitable means may be employed to clamp the two assemblies together. A core 96 is shown as located within the casting cavity 98.

It will be noted that the frame 18, which is formed of metal, also functions as a spacer and determines the thickness of the mold shell formed. This frame is the only portion of the pattern assembly which contacts either the sand-resin blowhead 20 or the green sand blowhead 68.

An apparatus for automatically or semi-automatically producing the above-described reinforced shell mold is shown in Figure 6. This apparatus includes a frame 100 having vertical frame members or uprights 102 and 104 and horizontal frame members 106 supported by the uprights. The frame supports a traverse mechanism 108 having suitable rails 110. Carried by the traverse mechanism by means of wheels 112 riding on the rails 110 are a sand-resin blowhead and magazine assembly 114, an electrically heated pressure head 116, and a green sand blowhead and magazine assembly 118. The blowheads, which are preferably water cooled, and the press heads may be of the construction hereinbefore described in detail. Located between the uprights 102 is a pattern rest table or lift table 120 which supports a heated metal pattern 121. This table is supported and kept in proper alignment by vertically movable guide bars 122. A hydraulic or air cylinder 124 serves to raise and lower the rest table, while a second air or hydraulic cylinder 126 vertically moves a stripper plate 128.

A hopper 130 for containing green sand is located at one end of the apparatus, while a second hopper 132 containing the sand-resin molding mix is located at the other end of the apparatus.

The sequence of operation of the above-described machine is as follows. Initially a predetermined amount of sand-resin molding mix is transferred from the hopper 132 to the magazine 134 connected to the sand resin blowhead 133 of the assembly 114. This magazine and blowhead are then moved horizontally on the traverse mechanism to a position above the heated pattern 121 on the lift table. Next the pattern and table are raised by means of the cylinder 124 until the pattern is located within the blowhead 133. Thereafter compressed air from air applying means on the frame is conveyed through the top of the magazine 134 and forces the sand-resin molding mix into contact with the heated pattern 121. After the mold shell 131 is formed on the pattern, the lift table and pattern are lowered and the sand-resin blowhead and magazine assembly are moved back in the direction of the sand-resin hopper 132.

Thereafter the heated pressure head 116, which initially had been located immediately to the left of the pattern rest table, as viewed in Figure 6, is moved into position over the heated pattern between the uprights 102. The pattern lift table is again raised to force the mold shell 131 formed on the pattern against the contoured lower surfaces of the pressure head. The mold is thereby compressed and cured in the manner hereinbefore described. The lift table 120 is then again lowered, and the press head 116 is moved into the position shown in Figure 6. Subsequently the green sand blowhead and magazine assembly 118, which originally was located at the end of the frame adjacent the green sand hopper 130 where the magazine portion 135 was filled with green sand, is moved over the mold and pattern on the lift table. This table is once more raised to position the mold-forming portion of the pattern within the blowhead or flask, 136, after which the green sand is blown into this flask by means of compressed air in the same manner as the sand-resin mix had been blown. After the green sand blow the lift table is again lowered, while the stripper plate 128 is simultaneously raised to contact the lower ends of stripper pins 137 in the pattern and force them upwardly to help lift the cured mold shell off the pattern, thus completing the mold-forming cycle.

The green sand blowhead and magazine assembly 118, together with the mold shell, is next moved in the direction of the green sand hopper. Here the detachable green sand blowhead or flask 136, the sand-resin mold shell 131, and the interjacent green sand supporting layer 140 are deposited on a suitable conveyor 142. Thereafter the reinforced shell mold and flask are conveyed to an area where two such shell mold assemblies are joined together and the molten casting metal is poured.

An appropriate mechanism 144 may be affixed to the green sand magazine 135 to hold the flask in position against the magazine and to release the flask and deposit it on the conveyor. The mechanism 144 may be provided with suitable retractible arms 148 for this purpose.

After the casting, the burned out sand-resin shell, and the reinforcing green sand layer have been removed from the flask, it can be placed on the conveyor and returned to the mold-forming machine. The flask may then be again clamped to the green sand magazine 135 by means of the mechanism 144 and removed from the conveyor.

For certain applications, most of the principles embodied in the above-described machine and process can be employed with a generally similar apparatus in which the pressure head 116 is omitted. Thus it is possible to initially form the shell layer 131 by means of the blowhead 133 or otherwise and thereafter cure this layer by heating it without the application of pressure. An appropriate internal heating element, such as the element 16 shown in Figures 1 through 3, may be used for this purpose. After the shell mold layer has been cured, it is reinforced by green sand in the manner explained above. The green sand blowhead and magazine assembly 118 can be employed without modification for this purpose.

A reinforced shell mold produced in the foregoing manner possesses the necessary rigidity for use in precision casting operations. Yet it will allow for expansion of the casting upon pouring and solidification of the molten metal so as to prevent crushing or cracking of the thin casting-defining sand-resin layer.

It will be understood that the term "mold," as used herein, is a casting form which includes both molds and cores, this invention not being limited to the former. Likewise, the word "pattern" includes both mold patterns and core boxes. Of course, it also will be appreciated that the term "green sand" is used herein in the generic sense of a generally unbonded comminuted refractory material. It is not restricted to mixtures of sand which are normally bonded with clay and water and which usually also contain a small amount of seacoal.

Various modifications in the arrangement and details of the specific embodiment described and shown herein will be apparent to those skilled in the art and are contemplated as within the scope of the present invention as defined in the appended claims. For example, it should be clear that the mold-forming apparatus can be designed so that the blowheads and pressure head, rather than the pattern rest table, can be raised and lowered. Alternatively the rest table, as well as the blowheads and pressure head, could be vertically movable.

I claim:

1. A method of forming a reinforced shell mold which comprises applying to a heated metal pattern a mixture comprising 1% to 5% by weight of thermosetting resin and the balance finely divided refractory material to thereby fuse the resin and form a relatively porous shell of refractory material and resin adhering to the heated pattern, simultaneously applying sufficient heat and die pressure to the back of said shell to cure the resin and reduce the thickness of the said shell by approximately 15% to 25%, thereafter placing an unheated flask adjacent the back surface of said shell so as to provide a substantially completely enclosed cavity between said shell and a wall of said flask, and subsequently blowing green sand into said cavity so as to fully occupy it employing said flask as a blowhead.

2. A process for forming a shell mold having a green sand backing layer, said process comprising applying a mixture of sand and thermosetting resin to a pattern heated to a temperature of approximately 250° F. to 700° F. to thereby fuse the resin and form a shell of sand and resin adhering to said heated pattern, thereafter compressing said shell at a pressure of 25 to 2000 pounds per square inch with a die heated to a temperature of about 300° F. to 900° F. to strengthen said shell and to complete the cure of the resin in said shell, removing said die from said shell, subsequently placing a flask adjacent the back surface of said cured shell while it is still on said pattern to provide a substantially completely enclosed cavity between said shell and the wall of said flask, and thereafter blowing green sand into said cavity so as to completely occupy the same employing said flask as a blowhead.

3. A process for forming a shell mold having a green sand backing layer, said process comprising contacting a mixture consisting of about 2% to 5% by weight of thermosetting resin and the balance sand to a metal pattern heated to a temperature of about 450° F. to 600° F. for a time of not in excess of about one minute to fuse the resin and form a partially cured relatively porous sand-resin shell adhering to said heated pattern, thereafter applying pressure to the back of the partially cured shell by an accurately contoured die heated to a temperature of about 375° F. to 900° F. to complete the curing of said shell, said die being contoured to apply greater pressure to parts of the shell which are spaced from casting-defining walls thereof, moving said die out of contact with the cured shell, thereafter placing an unheated flask over the back surface of said shell so as to provide a substantially enclosed cavity between said shell and walls of said flask, blowing green sand into said cavity employing said flask as a blowhead while the shell is still adhering to said pattern, and subsequently removing the pattern from the cured shell.

4. A method of forming a precision casting by means of a reinforced shell mold, said method comprising contacting a mixture consisting of about 2% to 5% by weight of thermosetting resin and the balance finely divided refractory material with a metal pattern heated to a temperature of about 450° F. to 600° F. for a time ranging from a few seconds to about one minute to fuse the resin and form a partially cured relatively porous shell adhering to said heated pattern, thereafter applying pressure to the back of the partially cured shell by an accurately contoured die heated to a temperature of 375° F. to 900° F. for a time of about 15 to 20 seconds to complete the curing of said shell, said pressure being sufficient to reduce the thickness of the shell by about 20% to 25%, removing said die from the back of the cured shell, placing a blowhead adjacent the back of said shell and attaching it thereto so as to provide a substantially enclosed cavity having an average thickness not in excess of approximately two inches between said shell and a wall of said blowhead, forcing green sand into said cavity so as to fully occupy it, subsequently removing the pattern from the cured shell and attached blowhead, placing said shell and attached blowhead into contact with a similar shell and blowhead to form a casting cavity between said shells, and thereafter pouring molten metal into said casting cavity.

5. An apparatus for forming a shell mold having a sand backing layer, said apparatus comprising a frame, a heated pattern, means for applying a mixture of sand and thermosetting resin to said heated pattern to form an adherent layer of said mixture thereon, a pressure head supported by said frame and movable to a position adjacent the layer on said pattern, means for thereafter positioning said layer adhering to said pattern against said pressure head to compress said layer, means for moving said pressure head out of contact with said layer, a green sand blowhead also supported by said frame and movable to a position adjacent the layer on said pattern, means for introducing green sand to said green sand blowhead, means for thereafter moving said pattern and cured layer into position adjacent said green sand blowhead, and means for blowing sand into a cavity formed between said green sand blowhead and said layer.

6. An apparatus for forming a shell mold having a green sand backing layer, said apparatus comprising a frame, a traverse mechanism supported by said frame, a vertically movable platform having a heated metal pattern seated thereon, a sand-resin blowhead supported by said traverse mechanism and movable horizontally to a position above said platform, means for introducing a mixture of sand and thermosetting resin into said blowhead, means for elevating said platform to cause the heated pattern to contact said blowhead, means for blowing said mixture through said blowhead and into contact with said heated pattern to form an adherent layer of said mixture thereon, means for applying heat to said layer to cure the same, means for removing said blowhead from above said pattern, a second blowhead also supported by said traverse mechanism and movable horizontally to a position above said platform, means for introducing sand into said second blowhead, means for thereafter positioning said second blowhead over said pattern and cured layer, and means for blowing sand through said second blowhead into a cavity formed between said second blowhead and said layer.

7. An apparatus for forming a shell mold having a green sand backing layer, said apparatus comprising a frame, a traverse mechanism supported by said frame, a vertically movable platform having a heated metal pattern seated thereon, a sand-resin blowhead supported by said traverse mechanism and movable horizontally to a position above said platform, means for introducing a mixture of sand and thermosetting resin into said blowhead, means for elevating said platform to cause the heated pattern to contact said blowhead, means for blowing said mixture through said blowhead and into contact with said heated pattern to form a partially cured adherent layer of said mixture thereon, means for removing said blowhead from above said pattern, a heated pressure head supported by said traverse mechanism and movable horizontally to a position over said platform, means for elevating said platform to cause said heated pressure head above said platform to compress and cure said layer adhering to said pattern, means for removing said pressure head from above said pattern, a green sand blowhead also supported by said traverse mechanism and movable horizontally to a position over said platform, means for introducing green sand into said green sand blowhead, means for thereafter positioning said green sand blowhead over said pattern and cured layer, and means for blowing green sand through said green sand blowhead into a cavity formed between said green sand blowhead and said layer.

References Cited in the file of this patent

UNITED STATES PATENTS

| | | |
|---|---|---|
| 805,144 | Kuller | Nov. 21, 1905 |
| 1,492,353 | Campbell | Feb. 10, 1921 |
| 1,533,220 | Campbell | Apr. 14, 1925 |
| 1,695,925 | Lawlor | Dec. 18, 1928 |
| 2,705,822 | Vennerholm | Apr. 12, 1955 |
| 2,720,687 | Shaw | Oct. 18, 1955 |
| 2,721,363 | Taylor | Oct. 25, 1955 |
| 2,759,229 | Mognuson et al. | Aug. 21, 1956 |
| 2,873,493 | Thomson et al. | Feb. 17, 1959 |

FOREIGN PATENTS

| | | |
|---|---|---|
| 202,169 | Australia | Aug. 18, 1955 |
| 860,241 | Germany | Dec. 18, 1952 |

OTHER REFERENCES

Fiat Report No. 1168, PB 81284.

Foundry, volume 80, issue 6, pages 115, 116, 291 and 292. Pub. date June 1952.

Foundry, volume 81, issue 11, pages 170, 178, 180, 182, 184 and 254. Pub. date November 1953.

Foundry, vol. 84, No. 2, pages 78–83, 142, 146 and 149. Pub. date February 1956.

UNITED STATES PATENT OFFICE

CERTIFICATE OF CORRECTION

Patent No. 2,945,272                          July 19, 1960

Alfred L. Boegehold

It is hereby certified that error appears in the printed specification of the above numbered patent requiring correction and that the said Letters Patent should read as corrected below.

Column 1, line 48, for "annd" read -- and --; column 4, line 47, for "heated" read -- seated --.

Signed and sealed this 31st day of January 1961.

(SEAL)
Attest:

KARL H. AXLINE                                            ROBERT C. WATSON
Attesting Officer                                         Commissioner of Patents